United States Patent

[11] 3,569,696

| [72] | Inventor | Eskil L. Karlson<br>Stamford, Conn. |
|---|---|---|
| [21] | Appl. No. | 765,921 |
| [22] | Filed | Oct. 8, 1968 |
| [45] | Patented | Mar. 9, 1971 |
| [73] | Assignee | Pollution Control Industries Inc.<br>Stamford, Conn. |

[54] METHOD AND APPARATUS FOR MEASURING SIMULTANEOUSLY A PLURALITY OF COMPONENTS OF A TEST SAMPLE
5 Claims, 2 Drawing Figs.

[52] U.S. Cl. ................................................ 250/43.5,
250/86, 356/205
[51] Int. Cl. .................................................. G01n 21/26
[50] Field of Search .......................................... 250/43.5,
86; 356/205, 206

[56] References Cited
UNITED STATES PATENTS
2,431,019  11/1947  Barnes ......................... 250/43.5
2,898,800  8/1959  Bergson ....................... 250/43.5X
3,194,962  7/1965  Carlon et al. ................ 250/86X
3,349,241  10/1967  Schmitt et al. ............... 250/43.5

*Primary Examiner*—Archie R. Borchelt
*Assistant Examiner*—A. L. Birch
*Attorney*—John W. Hoag ABSTRACT: The amounts of two or more gases in a test sample of a mixture of gases from an internal combustion engine exhaust are measured simultaneously by splitting a source of radiant energy into two beams, employing one beam as a control beam, and employing the other beam as a test beam and passing it through the sample, and thereafter directing both beams from opposite sides of the plane of a rotating chopper, which has a mirror surface on both sides, alternately to two band pass filters having transmission corresponding respectively to the absorption bands of the gases being measured, and directing the radiation passing said filters respectively to detector means.

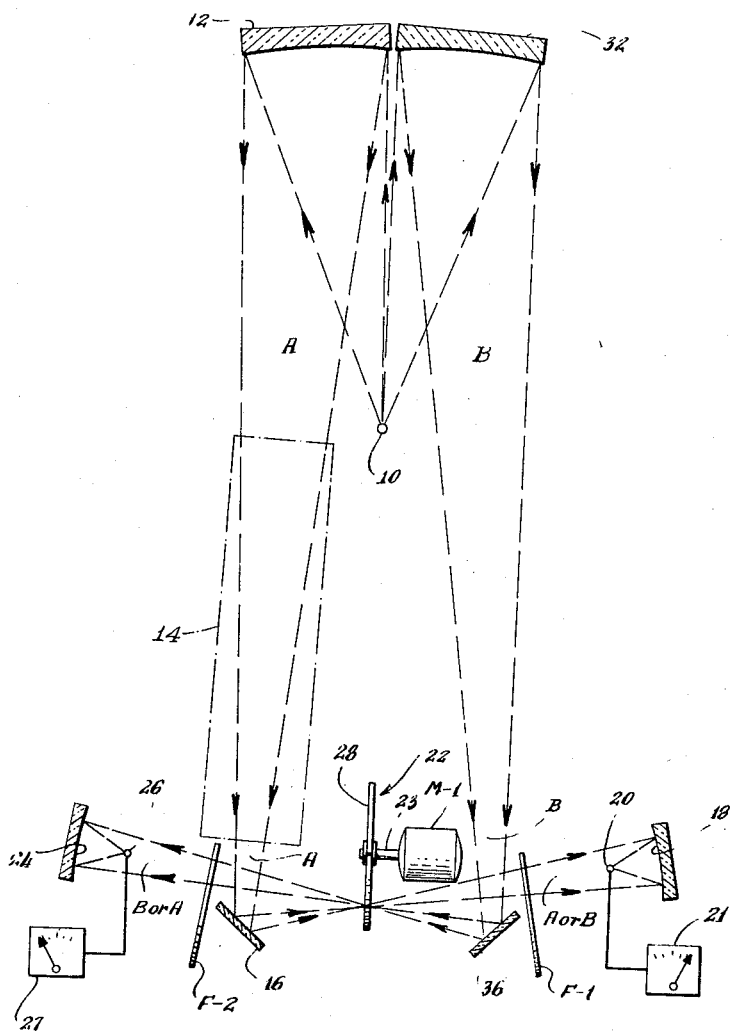

METHOD AND APPARATUS FOR MEASURING SIMULTANEOUSLY A PLURALITY OF COMPONENTS OF A TEST SAMPLE

FIELD OF THE INVENTION

This invention relates to method and means for simultaneously testing for a plurality of components of a test subject by providing a plurality of filters having transmission corresponding respectively to the absorption bands of a plurality of materials possibly comprising the test subject, employing two corresponding beams and passing one beam through the test subject or test sample and employing the other beam as a control, interposing the filters alternately within each of the beams, and directing the radiation passing the filters respectively to detector means, electrically separating the signals from the detectors into two or more electric channels, and connecting the channels electrically with readout means.

The invention may be applied for testing simultaneously for the presence and quantity of a plurality of the components of a test sample by employing a source of radiant energy, such for example as a source of infrared energy, splitting it in to two beams, passing one of said beams, hereinafter referred to as the test beam, through the test sample, and employing the other beam as a control, and directing each beam alternately through filters having transmission corresponding to the absorption bands of said components respectively, comparing the radiation passing each of the filters alternately from the control beam and from the test beam (from which some components have been partly or completely absorbed while travelling through the test sample) and communicating the result of the two comparisons to separate readout means.

One specific application contemplated is for testing the exhaust of automobile engines, and other forms of internal combustion engines, by measuring two or more of the component gases simultaneously instead of testing separately for each known or possible component.

In automobile factories the engines of cars still on the assembly line are being started and their exhaust gases tested to see if they comply with recently instituted government regulations and the standards set by the automobile company. Because of the speed of travel of the assembly line these tests have to be made very quickly and of course the results have to be dependable. By the invention disclosed herein it becomes possible to test exhaust gases simultaneously for two or more specific gases, such for example as carbon monoxide, carbon dioxide, and nitrous oxide.

SHORT DESCRIPTION OF THE DRAWINGS

The invention will be best understood by reading the following description in connection with the drawings in which;

FIG. 1 is a schematic view of a system embodying the invention

FIG. 2 is a front elevation of a chopper

FIG. 3 is a front elevation of a single, unitary filter

FIG. 4 is a front elevation of a rotatable plural filter, showing switch operating magnets attached to each filter, and a magnetic pickup head, and FIG. 5 is a schematic view of a rotatable plural filter member included in a circuit with switch means for separating into separate channels the two different signals given by a detector exposed alternately to the different bands of radiation passed by the two filters comprising the plural filter member.

DESCRIPTION OF A PREFERRED EMBODIMENT

For testing simultaneously for two gas components, as for example CO and $CO_2$, two band pass filters having transmission corresponding to the absorption energy bands of CO and $CO_2$ are employed. A test beam and a control beam are alternately passed through each of the filters to two detectors which are each connected to a readout device. The beams are obtained by splitting a source of infrared energy into two beams. While beams of energy may be directed alternately through a plurality of band pass filters in various ways, in the embodiment of the invention described herein, a chopper, comprising two spaced and opposed quadrants of a disc with a mirror surface on both sides of each quadrant, is employed. The test beam, i.e. the beam which has passed through a test sample, and an a control beam, are passed through the field of rotation of the chopper from either side of the plane of said field of rotation, thereby a causing each beam to alternately (1) pass directly through an open space in the field of rotation of the chopper in the interval between the passage of the radially spaced chopper quadrants, to one of said band pass filters, and (2) to be reflected from the mirror surface of one of the chopper quadrants to the other of said band pass filters. Thus the test beam and the control beam are each directed alternately (1) to a filter which passes the CO band, and (2) to a filter which passes the $CO_2$ band. The differential between the CO energy from the test and control beams alternately passing the CO filter will not be the same as the differential between the $CO_2$ energy from the test and control beams alternately passing the $CO_2$ filter. The two energy differentials are picked up by the detectors respectively and translated into electrical energy and transmitted to separate readout devices.

As illustrated in the drawings two beams A and B are obtained from a source of infrared energy 10. A The A beam is employed as the test beam and the B beam is employed as the control beam. As is well understood, the two beams from the source of infrared energy each include a range of wave lengths comprising the infrared portion of the spectrum, and the specific gases within the exhaust test sample each has its own absorption wave length sometimes referred to as its characteristic "color," and will absorb part or all of the energy of the corresponding portion of the spectrum band within the test beam depending upon the quantity of the specific gas in the test sample. If for example there is carbon monoxide present in the test sample its energy will absorb all or part of its portion of the spectrum, and therefore the test beam when it leaves the test sample will differ from the control beam because it will lack a part of the wave energy present in the control beam. Therefore the radiation which passes through the CO band pass filter from the test beam will be different from the radiation which passes the CO band pass filter from the control beam by the amount of CO present in the test sample 14. Similarly the radiation which passes the $CO_2$ band pass filter from the test beam will differ from the radiation which passes the $CO_2$ band pass filter from the control beam by the amount of $CO_2$ present in the test sample 14.

The test beam A is directed, as by reflection from spheroidal mirror 12, to pass through a container 14 filled with a test sample of the gases from an automobile exhaust, to the angled mirror which by which it is reflected to pass, either directly through filter F-1 to the elipsoidal mirror 18 by which it is focused on detector 20, or to be reflected from one of the two quadrants of a chopper 22, through filter F-2 to the elipsoidal mirror 24 by which it is focused on detector 26.

Chopper 22 comprises two radially opposed quadrants of a disc which is rotated as by motor M-1 through the field of rotation 28. Both faces of each quadrant of the chopper have mirror surfaces. Since the two quadrants comprising the chopper are spaced apart by voids equal to the spaces occupied by the chopper quadrants a beam directed from either side of the field of rotation 28 will alternately pass through the voids in said field of rotation and be reflected by a chopper quadrant.

The control beam B is directed, as by reflection from spheroidal mirror 32, to the angled mirror 36 by which it is reflected to pass, either directly through filter F-2 to the elipsoidal mirror 24 by which it is focused on detector 26 or to be reflected from one of the two quadrants of chopper 22, through filter F-1, to the elipsoidal mirror 18 by which it is focused on detector 20.

The filters F-1 and F-2 are disposed on opposite sides of the plane of rotation of chopper 22 and they are adapted to pass the energy bands corresponding respectively to the two components which are being measured simultaneously, specifically CO and $CO_2$ in this illustration. For testing simultaneously for only two components only a pair of single, nonrotatable filters are required, as shown in FIG. 1. Filter F-1 is disposed in the direct path of test beam A reflected from angled mirror 16 and in the path of control beam B reflected from angled mirror 36 and again reflected by one of the quadrants of chopper 22. Filter F-2 is disposed in the direct path of the control beam B reflected from angled mirror 36 and in the path of test beam A reflected from angled mirror 16 and again reflected by one of the quadrants of chopper 22.

If desired the control beam may be passed through a medium such as nitrogen to prevent it from being affected by room air and to maintain it constant.

In FIG. 4 two semicircular band pass filters, comprising together a rotatable disc 40, are illustrated and identified as band pass filters F-3 and F-4, which are adapted to pass different bands of radiation corresponding to different components of the test sample. As shown each of the band pass filters F-3 and F-4 has on its periphery a magnet 42 and as the filters rotate around axis 44 the magnets successively and alternately pass close to the magnetic pickup head 46.

In FIG. 5 the rotatable disc 40 comprising band pass filters F-3 and F-4 is shown in side elevation in connection with circuitry for leading the radiation passing the respective filters to amplifier 48 and switch 50, and for connecting the pickup head 46 to switch 50 causing it to be alternately connected to the readout devices 52 and 54 for giving separate readings of the radiation differential passed by each of said filters F-3 and F-4.

By substituting a plural filter such as is shown in FIGS. 4 and 5 in place either filter F-1 or F-2, and rotating the plural filter around its axis as by motor M-2 in synchronism with the rotation of the chopper 22, tests may be made simultaneously for three components of a test sample, and by substituting plural filters for each of filters F-1 and F-2 tests may be made simultaneously for four or more components of a test sample.

There has thus been provided a method and a system by which the objects of this invention are accomplished in a thoroughly practical way.

I claim:
1. The method of testing simultaneously for a plurality of components in the radiant energy spectrum of a test subject which comprises, providing a plurality of band pass filters having transmission corresponding respectively to the absorption band of the components, providing two corresponding energy beams, passing one of said beams through said test subject, interposing said band pass filters alternately within each of said beams, focusing the radiation passing said band pass filters respectively upon detector means, measuring the radiation differential passing each of said filters from said two beams, and communicating the respective measurements to separate readout means.

2. The method of measuring simultaneously the quantity of a plurality of components in a test sample, which comprises, splitting a source of radiant energy into two beams, employing one beam as a control beam, and passing the other beam through the sample, providing a chopper having mirror surfaces on both sides, rotating the chopper, disposing a pair of band pass filters on opposite sides of the plane of said chopper, alternately passing each beam directly to one of said band pass filters and reflecting the beam from a mirror surface of the chopper to the other of said band pass filters, focusing the radiation passing through said band pass filters respectively upon detectors and connecting the detectors to readout devices.

3. The method claimed in claim 2 including the step of employing a plurality of band pass filters on a rotatable mount, rotating the mount, alternately passing each beam through each of the filters comprising said plurality of filters, communicating to detector means the radiation passing each of said filters respectively from said beams, and communicating the energy differential passing each of said filters to readout means.

4. A system of determining simultaneously whether a plurality of components are present in a test sample and for indicating the amount of each of said components if present, which comprises, a plurality of corresponding beams of radiant energy, a test sample comprising a plurality of components, a chopper member having a mirror surface on both sides, means for rotating the chopper member within a plane normal to the axis of rotation of the chopper thus alternately opening and closing successive areas of the portion of said plane within which the chopper rotates, a pair of band pass filters disposed on opposite sides of the plane of rotation of said chopper member, said filters being respectively transparent to the absorption energy bands of the specific gases the presence and amount of which are being measured, detectors of radiant energy disposed to receive the radiation passing said filters respectively, means for directing one of said beams through said test sample, means for thereafter directing both beams through the field of rotation of the chopper from opposite sides of the plane of the chopper thereby causing each beam to be incident alternately on each of said band pass filters, means for comparing and measuring the radiation passing each of said filters from each of said beams, and means for comparing the difference in the energy passing each of said filters from each of the beams.

5. The system claimed in claim 4 in which at least one of the band pass filter members is rotatable and comprises a plurality of filters, and means for rotating the rotatable plural filter member in synchronism with the rotation of the chopper.